Aug. 11, 1970     P. R. VAN THIELEN     3,523,463

SPROCKET WHEEL

Filed Feb. 19, 1969     2 Sheets-Sheet 1

PAUL R. VAN THIELEN
INVENTOR

BY Harry M. Saragovitz
Edward J. Kelly
Herbert Berl
Maxwell V. Wallace
ATTORNEYS.

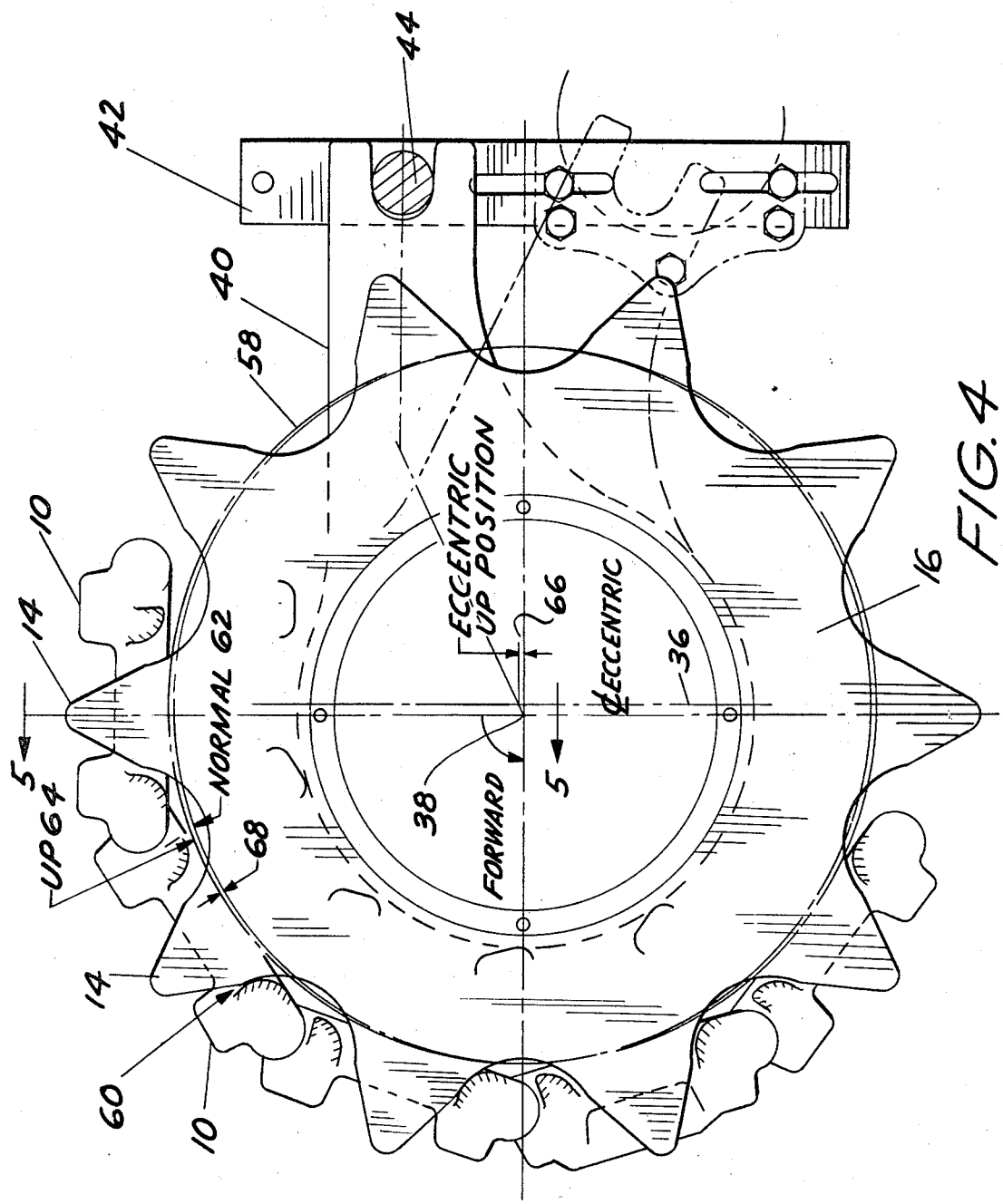

United States Patent Office

3,523,463
Patented Aug. 11, 1970

3,523,463
SPROCKET WHEEL
Paul R. Van Thielen, Birmingham, Mich., assignor, by mesne assignments, to the United States of America as represented by the Secretary of the Army
Filed Feb. 19, 1969, Ser. No. 800,651
Int. Cl. F16h 55/30
U.S. Cl. 74—243
8 Claims

ABSTRACT OF THE DISCLOSURE

A sprocket wheel for an endless track including an eccentrically adjustable, freely rotatable wheel mounted thereon to delay engagement of the track and the sprocket teeth.

---

This invention relates to sprocket wheels for an endless track and more particularly, to a device for delaying engagement of the track with the sprocket teeth.

Track drives in their present state of development are relatively simple sprocket arrangements. Some military track vehicles use rubber support hubs in conjunction with the support tires, but the majority use a simple sprocket. A double sprocket is most common. Through careful study and analysis, it has been shown in the past, that track suspension systems consume a substantial portion of engine horsepower through track flexing, sprocket engagement, and track vibration. Sprocket life of existing hardware is not as great as desired. Sprocket wear, due to friction and excessive impact loading, creates maintenance problems. Power consumption and wear have a direct effect on vehicle operational cost and should locally be reduced as much as possible. Various ways of improving track efficiency have been tried, such as rubber bushed and solid bushed link tracks (single or double pin) and many different configurations of band tracks. Each of these solves some problems, but creates others.

According to the present invention, there is provided a sprocket wheel which tends to damp out the vibrations in the track and delay abrupt contact of the track with the sprocket. Before any metal to metal engagement takes place between the sprocket tooth and the track, the track shoes engage an elastomeric covered wheel running eccentric to the sprocket. Sprocket tooth contact is retarded by the over pitching of the wheels, which tends to further damp out vibrations. Friction and wear are reduced. These effects help prevent energy loss and increase the life of not only the sprocket but also the track shoes. Any reduction in friction or wear will reduce the horsepower requirements.

Other objects and advantages of the present invention will become apparent to those of ordinary skill in the art by the following description when considered in relation to the accompanying drawing of which:

FIGS. 1–3 diagrammatically show a track entering a sprocket wheel at various lines of approach.

FIG. 4 is a side elevational view of a sprocket wheel according to the preferred embodiment of the invention.

Figure 1:
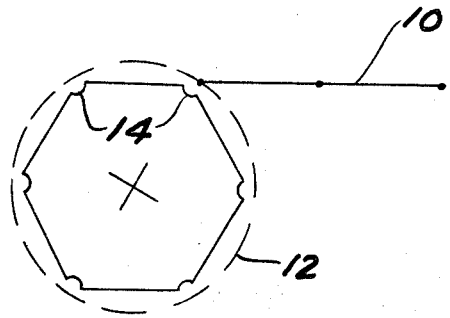

Referring now to the drawing, a portion of an endless track is shown schematically at 10 secured about a sprocket wheel, the pitch circle of which is shown at 12. As the track approaches the sprocket wheel, oscillatory motions and vibrations are set up by movement across road wheels (not shown). In addition, chordal action is a serious limiting factor in track performance. Chordal action may be described as the variation from smooth or even power transmission to sprocket engagement. The power is transmitted with a variation in driving speed for each track segment, and the sprocket engagement is best described as a series of impacts. It may also be described as a vibratory motion caused by the rise and fall of the track as it goes over a small sprocket.

Figure 2:
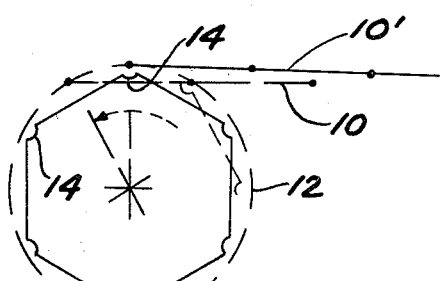
Figure 3:
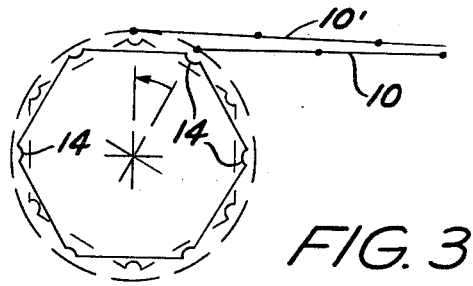

Reference to FIGS. 1–3 will clarify the cause and effects of chordal action. The sprocket teeth in FIGS. 1–3 are shown schematically at 14. When track 10 engages teeth 14, the line of approach is not tangent to pitch circle 12. The track wheel makes contact below the tangency line and is then lifted up to the top of the sprocket as shown in FIG. 2 at 10′. As sprocket rotation continues to the left as shown by the arrow, the track drops back down again to its original line of approach from 10′ to 10. Because of its fixed pitch link, the pitch line of the link cuts across the chord between the two pitch points on the sprocket and remains in this position relative to the sprocket until the track disengages. This chordal action seriously detracts from track performance and life because (1) there is a very definite surge of force in the chain caused by the acceleration and deceleration of the track as it makes this chordal rise and fall and (2) when the track enters the sprocket, the tooth gap into which the joint is to fall is rising while the chain strand is falling. Therefore, at contact, there is a definite impact which is further aggravated by any increase in velocity. Chordal action, therefore, not only produces pulsations in the track, generates noise and vibration, but also curtails the power transmitting capacity and speed range of the system.

Figure 5:
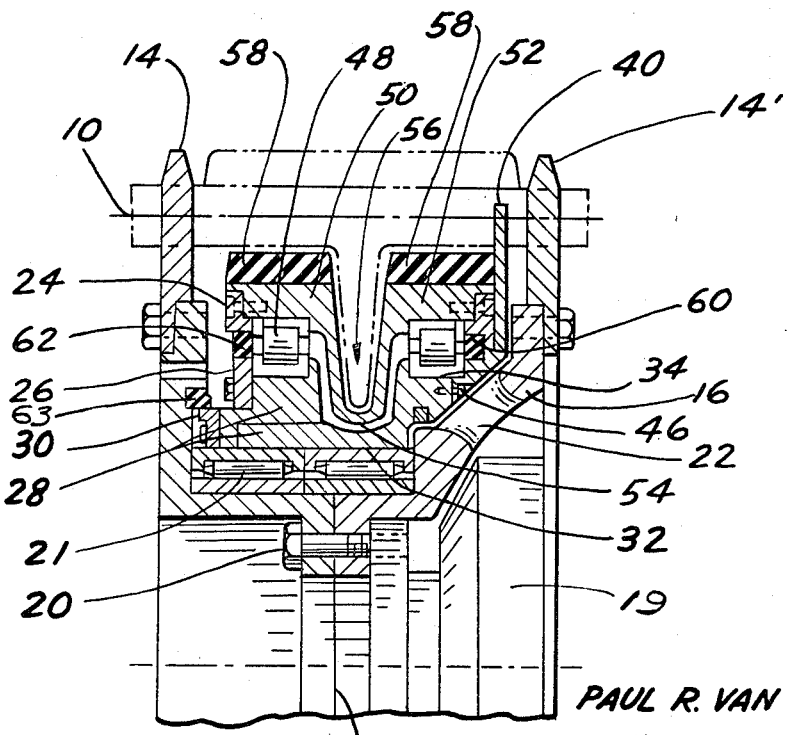
FIG. 5 is a cross-sectional view of a sprocket wheel according to the invention taken along lines 5—5 of FIG. 4.

Referring now to FIGS. 4 and 5, the endless track 10, shown mounted on sprocket hub 16, has a first and second plurality, and spaced apart teeth 14 and 14′ spaced about the outer periphery thereof. Hub 16 has two similarly shaped portions connected together at 18 by any suitable means such as bolt 20. Vent holes 22 are suitably provided therein to enable dirt and other foreign matter to pass therethrough. Support assembly 19 is connected to the center of hub 16 and provides support from the hull of the vehicle, not shown.

An eccentrically adjustable wheel is journalled on hub 16 by means of bearings 21. The eccentrically adjustable wheel includes first and second collars 24 and 26. Collar 26 includes spacer 28 secured together by suitable bolts and collar 30. The inner and outer peripheries 32 and 34 and collar 26 are substantially cylindrical.

As shown in FIG. 4, the center line of collar 26 lies along line 36 which is horizontally displaced from the center line 38 of the sprocket hub. A handle 40 is connected with the collar 26 and movable member 42 by means of pin 44. By movement of movable member 42 in a vertical direction, the amount of eccentricity of the wheel will be controlled. Handle 40 is shown in the up position in FIG. 4 with the normal down position shown in phantom. For convenience, handle 40 is shown out of position and connected to inner collar 26 by any suitable means such as bolts 46.

Referring again to FIG. 5, outer collar 24 is freely rotatably journalled on inner collar 26 by means of journalled bearings 48. Collar 24 includes first and second axially spaced apart sections 50, 52 connected by web 54 which protrudes radially inwardly therefrom to permit the track guide portion 56 of track 10 to pass therethrough. An elastomeric member 58 is rigidly secured to the outer peripheral surface of the sections 50 and 52. Member 58 may comprise a rubber tire vulcanized to the wheel, preferably having a durometer of 70–5. As shown in FIG. 4, the outer diameter of sections 50, 52, which include elastomeric members 58 is substantially equal considering the compressibility of the elastomer, to the dimension required to support the track on the pitch circle of the sprocket.

Seals 60 are provided in between first and second collars 24 and 26 whereas seals 61 are provided in between collar 30 and hub 16. The seals are preferably neoprene, vulcanized to retainer, and replaceable. They are shaped in such a way that when mud or dirt wedges between the track shoes, the seals tighten up around the journal pin preventing entry of foreign matter to the bearing surfaces.

In operation, as the track 10 approaches the sprocket wheel, oscillatory motions and vibrations are set up for reasons described hereinbefore. Before the individual links of track 10 engage teeth 14 and 14' of the sprocket wheel, the track shoes will engage the elastomeric member 58 of the sprocket wheel. Engagement with elastomeric member 58 will delay the time in which the track engages the sprocket teeth 14 and 14'. For example, by proper adjustment of the eccentricity of the sprocket wheel, the first contact of the sprocket teeth 14 and 14' and track 10 will be at 62 as shown in FIG. 4. Track vibration, noise, and track wear will be substantially reduced by the prior engagement with the elastomeric material 58.

The amount of eccentricity can be controlled by raising and lowering lever 40. With the lever 40 in the normal position shown in phantom in FIG. 4, the outer peripheral surface of elastomeric material 58 will be increased accordingly as shown at 64. The offset in the center line of the eccentrically adjustable wheel is substantially equal to the radial distance between lines 63 and 64. There is a deflection of the outer rubber material due to track tension as shown at 65.

What has been described therefore is a sprocket wheel which reduces the chordal action of an endless track and provides for a smooth transition of the track about the sprockets on which the track is mounted. Sprocket and track life is improved due to a reduction in abrasive action, caused by the track engaging the sprocket. The adjustment of the eccentric wheel can further provide for adjustments due to stretch, push and wear, and wear of the elastomeric tires. The eccentric wheel is free-wheeling to eliminate timing problems with the sprocket. The use of this wheel damps out the vibrations and delays abrupt contact of the track with the sprocket.

Since it is obvious that many changes and modifications can be made in the above-described details without departing from the nature and spirit of the invention, it is to be understood that the invention is not limited to said details except as set forth in the appended claims.

What I claim is:
1. A sprocket wheel for an endless track comprising a double sprocket hub having first and second pluralities of axially spaced apart sprocket teeth equidistantly spaced about the outer periphery of said hub, said sprocket being rotatable about a sprocket axis, and an eccentrically adjustable wheel rotatably mounted between said first and second pluralities of spaced apart teeth.

2. A sprocket wheel as set forth in claim 1 wherein the diameter of said eccentrically adjustable wheel is substantially equal to that required to cause the track to engage the sprocket of the pitch circle of said sprocket hub.

3. A sprocket wheel as set forth in claim 1 wherein said eccentrically adjustable wheel includes
first and second collars mounted concentrically with respect to each other,
said first collar being journalled on said second collar so as to be freely rotatable relative thereto and said second collar being journalled on said hub.

4. A sprocket wheel as set forth in claim 3 wherein means are connected with said second collar for controlling the eccentricity of said wheel and preventing rotation of said second collar from a predetermined position.

5. A sprocket wheel as set forth in claim 4 wherein elastomeric material is rigidly secured to the outer peripheral surface of said first collar.

6. A sprocket wheel as set forth in claim 5 wherein said first collar comprises first and second axially spaced apart sections connected by a radially inwardly extending web.

7. A sprocket wheel as set forth in claim 6 wherein first plurality of seals are placed between said first and second collars and a second plurality of seals are placed in between said second collar and said sprocket hub.

8. A sprocket wheel as set forth in claim 7 wherein the outside diameter of said first collar is substantially equal to that required to cause the track to operate on the pitch circle of said sprocket wheel.

References Cited

UNITED STATES PATENTS 2,893,787   7/1959   Nodwell _____ 74—243 XR
2,911,847   11/1959  Huck _____ 74—440

JAMES A. WONG, Primary Examiner

U.S. Cl. X.R.
74—242.16